(12) United States Patent
Zhao

(10) Patent No.: US 9,906,836 B2
(45) Date of Patent: Feb. 27, 2018

(54) VIDEO PLAYING APPARATUS, CONTROL APPARATUS, VIDEO PLAYING SYSTEM AND CONTROL METHOD

(71) Applicant: BOE TECHNOLOGY GROUP CO., LTD., Beijing (CN)

(72) Inventor: Tianyue Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 7 days.

(21) Appl. No.: 14/437,101

(22) PCT Filed: Aug. 22, 2014

(86) PCT No.: PCT/CN2014/085049
§ 371 (c)(1),
(2) Date: Apr. 20, 2015

(87) PCT Pub. No.: WO2015/165177
PCT Pub. Date: Nov. 5, 2015

(65) Prior Publication Data
US 2016/0269784 A1    Sep. 15, 2016

(30) Foreign Application Priority Data
Apr. 28, 2014  (CN) .......................... 2014 1 0174592

(51) Int. Cl.
*H04H 60/45*    (2008.01)
*H04N 21/466*   (2011.01)
(Continued)

(52) U.S. Cl.
CPC ..... *H04N 21/4667* (2013.01); *H04N 21/4223* (2013.01); *H04N 21/4333* (2013.01);
(Continued)

(58) Field of Classification Search
CPC ......... H04N 21/4667; H04N 21/44218; H04N 21/4532; H04N 21/441; H04N 21/4223; H04N 21/4333
(Continued)

(56) References Cited

U.S. PATENT DOCUMENTS 6,470,497 B1 * 10/2002 Ellis .................... H04N 5/44543
348/563
7,665,104 B2 * 2/2010 Maehara ................ G08C 17/00
340/539.23
(Continued)

FOREIGN PATENT DOCUMENTS

CN    201188666 Y    1/2009
CN    101459806 A    6/2009
(Continued)

OTHER PUBLICATIONS

International Search Report Appln. No. PCT/CN2014/085049; dated Jan. 28, 2015.
(Continued)

*Primary Examiner* — Nnenna Ekpo
(74) *Attorney, Agent, or Firm* — Ladas & Parry LLP

(57) ABSTRACT

A video playing apparatus, a control apparatus, a video playing system and a control method are provided. The video playing apparatus comprising a storage unit (101), a receiving unit (102), a comparing and matching unit (103), a control unit (104) and a display unit (105), wherein the storage unit (101) is configured to store personal information and corresponding viewing information of a viewer, the personal information including identification information; the receiving unit (102) is configured to receive the identification information of the current viewer; the comparing and matching unit (103) is configured to retrieve the matched personal information in the storage unit according to the identification information of the current viewer; the
(Continued)

control unit (104) is configured to retrieve the corresponding viewing information stored in the storage unit according to the matched personal information, and perform a play control for a video, and the display unit (105) is configured to display the video information. Thus, an identity of the current viewer can be recognized, so that the corresponding viewing information can be acquired according to the personal information of the viewer to achieve an intelligent playing control for the video. The present disclosure has a good practicability and is well worth to be promoted.

17 Claims, 5 Drawing Sheets

(51) Int. Cl.
H04N 21/4627 (2011.01)
H04N 21/4223 (2011.01)
H04N 21/433 (2011.01)
H04N 21/441 (2011.01)
H04N 21/442 (2011.01)
H04N 21/45 (2011.01)

(52) U.S. Cl.
CPC ..... *H04N 21/441* (2013.01); *H04N 21/44218* (2013.01); *H04N 21/4532* (2013.01); *H04N 21/466* (2013.01); *H04N 21/4627* (2013.01)

(58) Field of Classification Search
USPC ........................................ 725/11, 10, 12, 46
See application file for complete search history.

(56) References Cited

U.S. PATENT DOCUMENTS

| | | | |
|---|---|---|---|
| 8,949,871 B2* | 2/2015 | Chai | H04H 60/45 725/10 |
| 2005/0060738 A1* | 3/2005 | Stecyk | H04N 7/163 725/10 |
| 2009/0133051 A1 | 5/2009 | Hildreth | |
| 2011/0154385 A1* | 6/2011 | Price | H04H 60/45 725/12 |
| 2013/0198634 A1* | 8/2013 | Matas | G06T 11/60 715/717 |
| 2015/0128158 A1* | 5/2015 | Wheatley | H04N 21/4532 725/12 |

FOREIGN PATENT DOCUMENTS

| | | |
|---|---|---|
| CN | 102611941 A | 7/2012 |
| CN | 102938193 A | 2/2013 |
| CN | 103310821 A | 9/2013 |
| CN | 103377672 A | 10/2013 |
| CN | 103581722 A | 2/2014 |
| CN | 103686279 A | 3/2014 |
| CN | 103957458 | 7/2014 |

OTHER PUBLICATIONS

Written Opinion of the International Searching Authority Appln. No. PCT/CN2014/085049; dated Jan. 28, 2015.
First Chinese Office Action dated Sep. 14, 2016; Appln. No. 201410174592.9.
Second Chinese Office Action dated Jan. 19, 2017; Appln. No. 201410174592.9.
The Third Chinese Office Action dated May 10, 2017; Appln. No. 201410174592.9.

* cited by examiner

VIDEO PLAYING APPARATUS, CONTROL APPARATUS, VIDEO PLAYING SYSTEM AND CONTROL METHOD

TECHNICAL FIELD

The present invention relates to a field of display technique, and in particular, to a video playing apparatus, a control apparatus, a video playing system and a control method.

BACKGROUND

A video playing technique has been very popular at home and various public places, however, there would be special demands on a controlling of the video playing in the different families or different public places, and these demands can be made for respective groups with different ages, careers, identities, interests, etc. For example, by taking the different ages as an example: for the children, their parents hope that their children would not watch TV for a long time since the children's vision would be affected and their study would be delayed; for the youth, they tend to watch TV in excess; and for the olds, they often forget to view their favorite TV programs or to turn off the TV, and the like.

The known control technique for video playing is a control technique without distinction, which can only perform some simple operations on the video playing, such as playback, pause, turn off and the like, but fails to recognize the different types of groups intelligently and to perform a personalized corresponding control.

SUMMARY

Embodiments of the present disclosure provide a video playing apparatus, a control apparatus, a video playing system and a control method, which are capable of addressing the issue that a personalized intelligent control can not be performed in the existing video playing technique.

Accordingly, the embodiments of the present disclosure provide a video playing apparatus comprising a storage unit, a comparing and matching unit, a control unit and a display unit, wherein:

the storage unit is configured to store personal information and corresponding viewing information of a viewer, the personal information includes identification information; a receiving unit is configured to receive the identification information of the current viewer; the comparing and matching unit is configured to retrieve the matched personal information in the storage unit according to the identification information of the current viewer; the control unit is configured to retrieve the corresponding viewing information stored in the storage unit according to the matched personal information, and to perform a play control on a video, and the display unit is configured to display the video information.

Optionally, the control unit comprises an information reading unit and an information processing unit;

the information reading unit is configured to read the viewing information corresponding to the personal information of the viewer in the storage unit according to the matched personal information as received, which is sent from the comparing and matching unit, and transmit the viewing information to the information processing unit;

the information processing unit is configured to control the display unit according to the received viewing information.

Optionally, the personal information of the viewer further comprises one or more of gender information and age information;

the viewing information comprises one or more of video channel shielding information, video channel selection information, video channel playing time limitation information and video channel playing time reminder information.

Optionally, the storage unit is further configured to store threshold conditions for a plurality of categories of the personal information and the respective viewing information corresponding to each category.

Optionally, the information reading unit is further configured to retrieve the viewing information corresponding to a certain category according to the matched personal information and transmit the same to the information processing unit, in a case in which the matched personal information belongs to the certain category.

Optionally, the information processing unit further comprises a first time processing unit configured to start to count according to the received video channel playing time limitation information, and/or to transmit the video channel playing time limitation information satisfying a time condition and/or the video channel playing time reminder information satisfying a time condition to the display unit when the video channel playing time reminder information is received;

The video channel playing time limitation information satisfying the time condition comprises information on stop of video playing, information on pause of video playing and information on resuming of video playing.

Optionally, starting to count according to the received video channel playing time limitation information, and/or transmitting the video channel playing time limitation information satisfying the time condition and/or the video channel playing time reminder information satisfying the time condition to the display unit when the video channel playing time reminder information is received comprises:

in a case in which the corresponding category of the matched personal information is a first category, the first time processing unit transmits the information on stop of video playing to the display unit if a viewing duration reaches a viewing time limitation; and/or the first time processing unit transmits the video channel playing time reminder information to the display unit if the video channel playing time reminder information is received;

in a case in which the corresponding category of the matched personal information is a second category, the first time processing unit transmits the information on pause of video playing to the display unit if the viewing duration reaches the viewing time limitation, and then transmits the information on resuming of video playing to the display unit when a pause duration satisfies a demand on resuming of video playing; and/or the first time processing unit transmits the video channel playing time reminder information to the display unit if the video channel playing time reminder information is received;

in a case in which the corresponding category of the matched personal information is a third category, the first time processing unit transmits the video channel playing time reminder information satisfying the time condition to the display unit.

Optionally, the apparatus further comprises a camera, including an optical camera and/or an infrared camera, connected with the control unit and configured to capture a contour information of the current viewer;

optionally, the information processing unit further comprises: a confirming unit configured to receive a real-time signal sent from the camera, and pause the playing of the video when the real-time signal can not be received; a second time processing unit connected with the confirming unit and configured to start to count when the confirming unit can not receive the real-time signal, and the playing of the video would be paused when the confirming unit fails to receive the real-time signal for a certain time period; and the second time processing unit stops counting and the playing of the video is resumed when the confirming unit receives the real-time signal again.

According to another aspect, the embodiments of the present disclosure further provide a video playing control apparatus comprising: a collection unit configured to collect identification information of a current viewer; and a transmitting unit configured to transmit the identification information of the viewer to a corresponding video playing apparatus.

Optionally, the collection unit comprises:

an identifying module configured to acquire one or more of fingerprints, face, voice and a password of the current viewer, as the identification information.

Optionally, the collection unit further comprises a setting module configured to set a personal information and corresponding viewing information of the viewer; the personal information further comprises one or more of gender information and age information; the viewing information comprises one or more of video channel shielding information, video channel selection information, video channel playing time limitation information and video channel playing time reminder information.

According to a further aspect, the embodiments of the present disclosure further provide a video playing system comprising the video playing apparatus described above and the video playing control apparatus described above.

According to a still further aspect, the embodiments of the present disclosure further provide a control method for a video playing system, comprising:

acquiring and storing personal information of a viewer and viewing information corresponding to the personal information of the viewer, wherein the personal information includes identification information;

receiving the identification information of the current viewer;

retrieving a matched personal information according to the identification information of the current viewer;

retrieving a corresponding viewing information according to the matched personal information, and controlling a playing of a video; and displaying video information.

It can be seen that, in the video playing apparatus, the control apparatus, the video playing system and the control method according to the embodiments of the present disclosure, the identification information of the current viewer can be compared with the information as pre-stored to obtain a comparison result, and therefore an identification of the current viewer can be recognized, so that an intelligent playing control of the video can be realized according to the viewing information of the current viewer. The present disclosure has a good practicability and is well worth to be promoted.

DETAILED DESCRIPTION

Thereafter, in order to make the objects, solutions and advantages of the embodiments of the present disclosure more clearly, the solutions of embodiments of the present disclosure will be described clearly and completely in connection with drawings of the embodiments of the present disclosure; Obviously, the described embodiments are only some, but not all of the embodiments of the present disclosure. Any other embodiments obtained by those ordinary skilled in the art based on the embodiments of the present disclosure without paying any inventive labors should fall into a scope sought for protection in the present disclosure.

Figure 1:
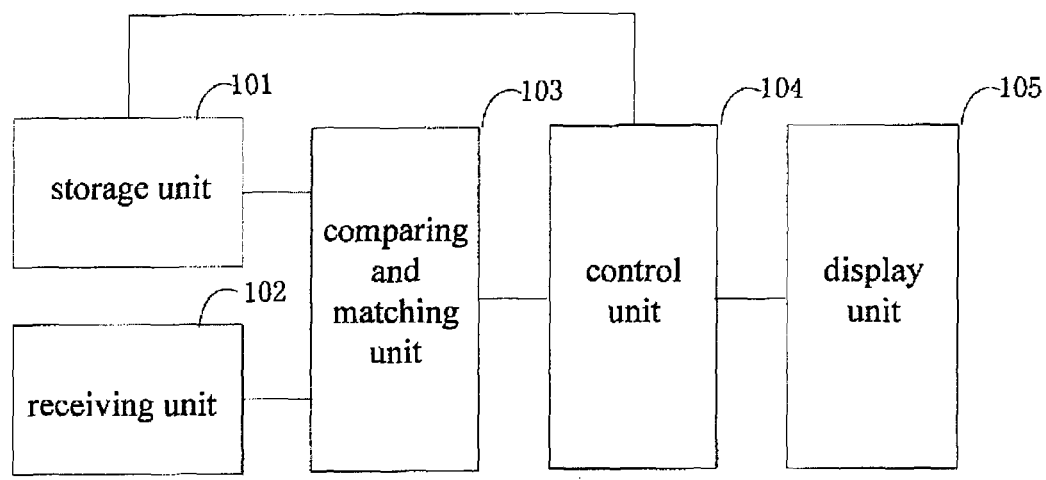
FIG. 1 is an exemplary view illustrating a basic configuration of a video playing apparatus according to embodiments of the present disclosure.

The embodiments of the present disclosure provide a video playing apparatus, and as illustrated in FIG. 1, the video playing apparatus comprises a storage unit 101, a receiving unit 102, a comparing and matching unit 103, a control unit 104 and a display unit 105, wherein:

the storage unit 101 is configured to store personal information and corresponding viewing information of a viewer, wherein the personal information includes identification information; the receiving unit 102 is configured to receive the identification information of the current viewer; the comparing and matching unit 103 is configured to retrieve the matched personal information in the storage unit according to the identification information of the current viewer; the control unit 104 is configured to retrieve the corresponding viewing information stored in the storage unit 101 according to the matched personal information, and to perform a play control for a video; and the display unit 105 is configured to display the video information.

It can be seen that, in the video playing apparatus according to the embodiments of the present disclosure, the identification information of the current viewer can be compared with the pre-stored information to obtain a comparison result, and thus an identification of the current viewer can be recognized, so that an intelligent playing control for the video can be realized according to the viewing information of the current viewer. The video playing apparatus according to the embodiments of the present disclosure is highly practical and is worth to be promoted.

Figure 2:
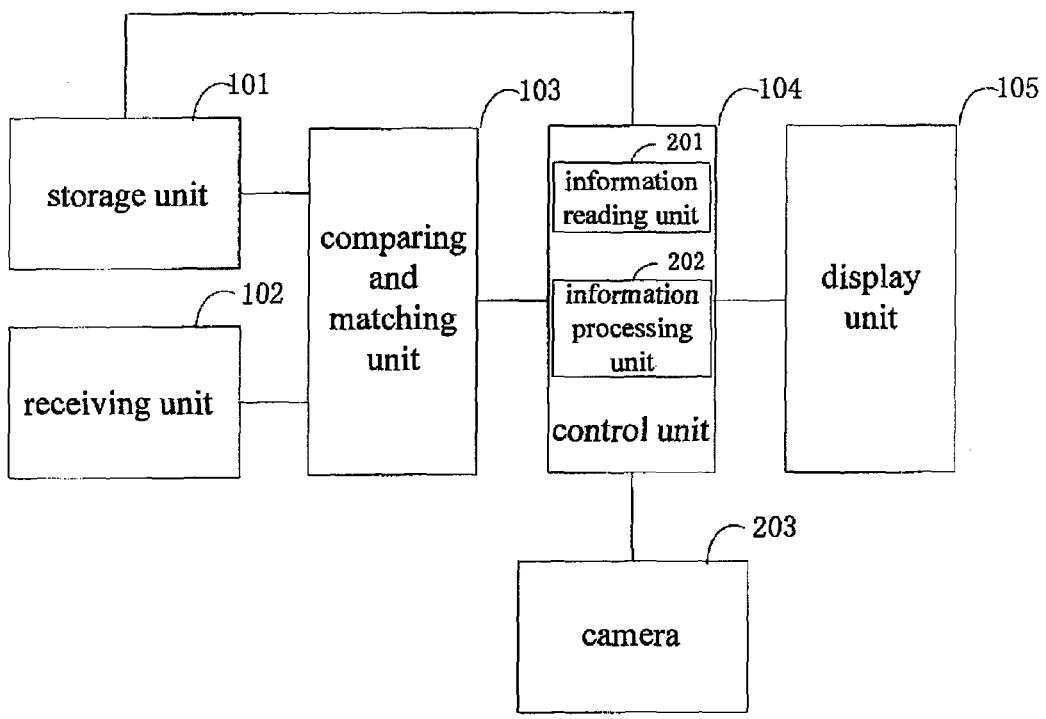
FIG. 2 is an exemplary view illustrating another optional configuration of the video playing apparatus according to the embodiments of the present disclosure.

The control unit 104 can acquire the corresponding viewing information according to the matched personal information corresponding to the identification information of the current viewer, process the viewing information and generate a viewing instruction for the display unit 105 and transmit the same to the display unit 105. In an example, the control unit 104 can comprise an information reading unit 201 and an information processing unit 202. Referring to FIG. 2, the information reading unit 201 can be configured to read the viewing information corresponding to the personal information of the viewer in the storage unit 101 according to the matched personal information sent from the comparing and matching unit 103 as received, and transmit the viewing information to the information processing unit 202; the information processing unit 202 can be configured to control the display unit 105 according to the received viewing information.

In an example, the personal information of the viewer can comprise gender information, age information, etc.; the viewing information can comprise video channel shielding information, video channel selection information, video channel playing time limitation information and video channel playing time reminder information, etc, for operations on shield, selection, time limitation or reminder for the display unit 105 to play the video.

The storage unit 101 can divide various pieces of personal information into different types and set a classification standard, such as the gender, or the different age groups and the like, and then can classify the various pieces of personal information based on the set classification standard. The different categories of the personal information can correspond to the different viewing information, so that different viewing instruction for operation can be performed by the display unit 105. In an example, the storage unit 105 can be further configured to store threshold conditions for a plurality of categories of the personal information and the respective viewing information corresponding to each category. As such, the video playing apparatus is not limited to a certain category of personal information, so that the application of the video playing apparatus is wider.

In an example, a detailed operational process can be as follows: the information reading unit 201 is further configured to retrieve the viewing information corresponding to a certain category according to the matched personal information and transmit the same to the information processing unit 202, in a case in which the matched personal information corresponds to the certain category; and the information processing unit 202 is further configured to control the display unit 105 according to the received viewing information. It should be noted that the classification standard can be based on the age group divided by age, and can also be based on other personal information; in the above case, the personal information can be classified into three categories, that is, children, adults and the olds. It can be understood that the categories of the personal information are not limited to the three categories described above, and the personal information can be classified into other categories, as long as these categories can be distinguished from each other.

In an example, specific processing devices and detailed processing process for the video channel playing time limitation information and/or the video channel playing time reminder information in the viewing information are as follows. The information processing unit 202 further comprises a first time processing unit 301; as illustrated in FIG. 3, the first time processing unit 301 is configured to start to count according to the received video channel playing time limitation information, and/or to transmit the video channel playing time limitation information satisfying a time condition and/or the video channel playing time reminder information satisfying the time condition to the display unit 105 when the video channel playing time reminder information is received; wherein the video channel playing time limitation information satisfying the time condition can comprise information on stop of video playing, information on pause of video playing and information on resuming of video playing, for controlling the playing of the display unit 105.

With respect to the different categories of personal information, the control can be performed on the playing time of different categories of video. More particularly, in a case in which the corresponding category of the matched personal information is a first category (for example, the children), the first time processing unit 301 transmits the information on stop of video playing to the display unit 105 if a viewing duration reaches a viewing time limitation; in a case in which the corresponding category of the matched personal information is a second category (for example, the adults), the first time processing unit 301 transmits the information on pause of video playing to the display unit 105 if the viewing duration reaches the viewing time limitation, and when a pause time satisfies a demand on resuming of video playing, the information on resuming of video playing is transmitted to the display unit 105; and in a case in which the corresponding category of the matched personal information is a third category (for example, the olds), the first time processing unit 301 transmits the video channel playing time reminder information satisfying the time condition to the display unit 105.

It should be noted that the each category of personal information can correspond to one or more types of the viewing information. For example, the first category of personal information can correspond to both of the video channel playing time limitation information and the video channel playing time reminder information, that is, in a case in which the corresponding category of the matched personal information is the first category, the first time processing unit 301 transmits the information on stop of video playing to the display unit 105 if the viewing time reaches the viewing time limitation; and the first time processing unit 301 transmits the video channel playing time reminder information to the display unit if the video channel playing time reminder information is received. That is to say, there is no conflict between the video channel playing time reminder information and other viewing information.

Figure 3:
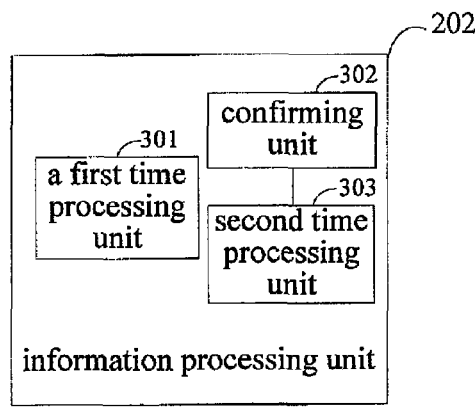
FIG. 3 is an exemplary view illustrating an optional configuration of an information processing unit of the video playing apparatus according to the embodiments of the present disclosure.

In order to know whether the current viewer is still viewing the video information so as to adjust the playing of the video and save energy, in an example, as illustrated in FIG. 2, the apparatus can further comprise a camera 203, including an optical camera and/or an infrared camera, connected with the control unit 104 and configured to capture the contour information of the current viewer; correspondingly, as illustrated in FIG. 3, the information processing unit 202 can further comprise: a confirming unit 302 configured to receive a real-time signal sent from the camera 203, and pause the playing of the video when the real-time signal is not received; a second time processing unit 303 connected with the confirming unit 302 and configured to start to count when the confirming unit 302 does not receive the real-time signal, and the playing of the video would be stopped when the confirming unit 302 fails to receive the real-time signal for a certain time period; and the second time processing unit 303 stops counting and the playing of the video is resumed when the confirming unit 302 receives the real-time signal again during a time period.

Figure 4:
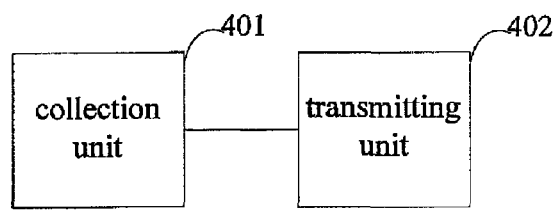
FIG. 4 is an exemplary view illustrating a basic configuration of a video playing control apparatus according to embodiments of the present disclosure.

The embodiments of the present disclosure further provide a video playing control apparatus, and as illustrated in FIG. 4, the video playing control apparatus comprises:

a collection unit 401 configured to collect identification information of a current viewer; and a transmitting unit 402 configured to transmit the identification information of the viewer to a corresponding video playing apparatus.

Figure 5:
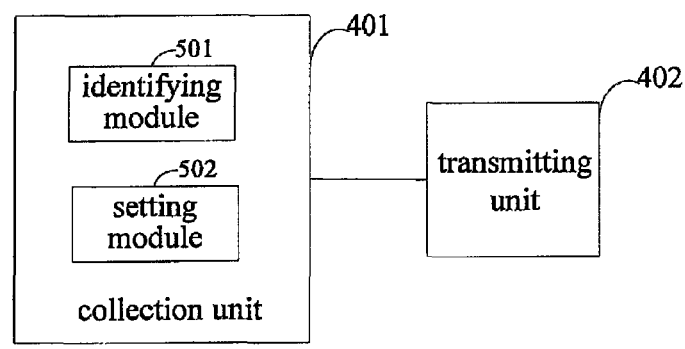
FIG. 5 is an exemplary view illustrating another optional configuration of the video playing control apparatus according to the embodiments of the present disclosure.

The collection unit 401 can identify the identification of the current viewer in various identifying manners. In an example, the collection unit 401 can further comprise: an identifying module 501, as illustrated in FIG. 5, configured to acquire one or more of fingerprints, face, voice and a password of the current viewer, as the identification information.

In an example, the collection unit 401 further comprises a setting module 502 configured to set a personal information and corresponding viewing information of the viewer; the personal information of the viewer can further comprise one or more of gender information and age information; the viewing information can comprise one or more of video channel shielding information, video channel selection information, video channel playing time limitation information and a video channel playing time reminder information.

The embodiments of the present disclosure further provide a video playing system comprising the video playing apparatus described above and the video playing control apparatus described above.

The video playing control apparatus according to the embodiments of the present disclosure can be a remote controller or can also be a wired controller, can be a single entity or can also be composed of several individual entities, as long as it has the functional units described above. Those skilled in the art can implement the above functional units with hardware, software, firmware or any combination thereof, and in turn form the video playing control apparatus according to the embodiments of the present disclosure.

Figure 6:
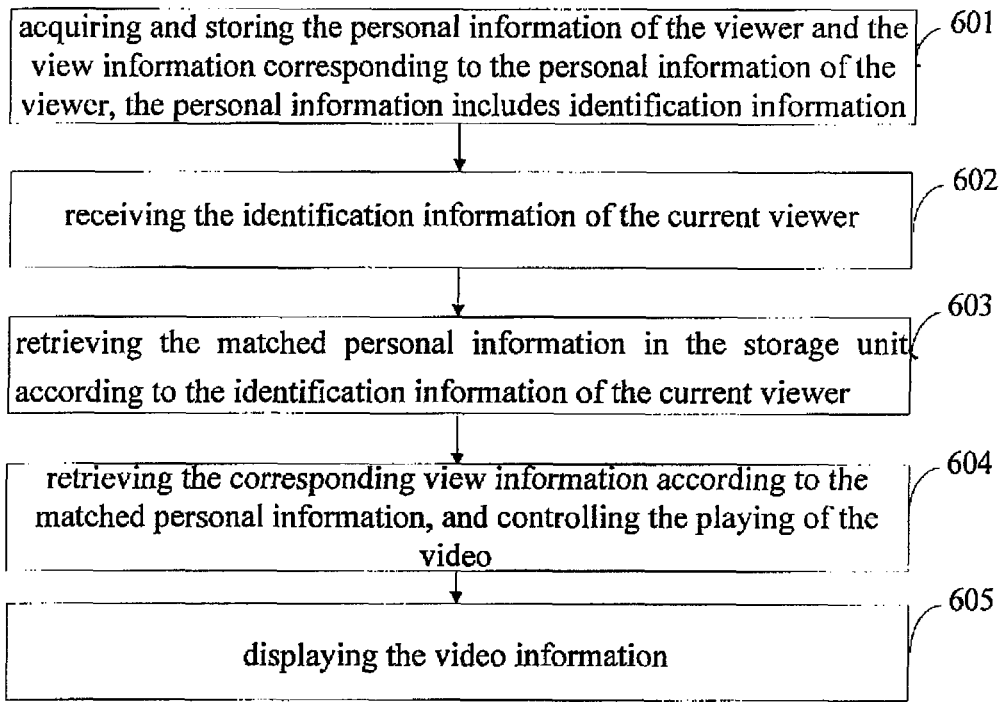
FIG. 6 is an exemplary view illustrating a basic flow of a control method for a video playing system according to the embodiments of the present disclosure.

The embodiments of the present disclosure further provide a control method for a video playing system, and as illustrated in FIG. 6, the control method comprises:

at step 601, acquiring and storing the personal information of the viewer and the viewing information corresponding to the personal information of the viewer wherein the personal information includes identification information;

at step 602, receiving the identification information of the current viewer;

at step 603, retrieving the matched personal information in the storage unit according to the identification information of the current viewer;

at step 604, retrieving the corresponding viewing information according to the matched personal information, and controlling the playing of the video; and at step 605, displaying the video information.

Figure 7:
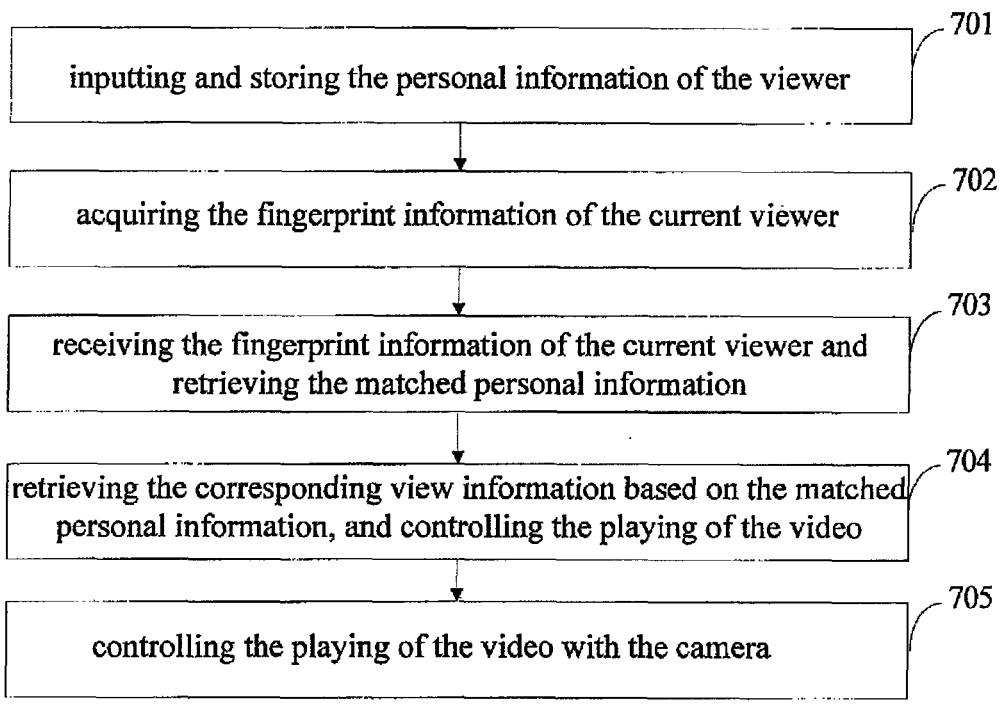
FIG. 7 is an exemplary view illustrating another optional flow of the control method for the video playing system according to the embodiments of the present disclosure.
Figure 8:
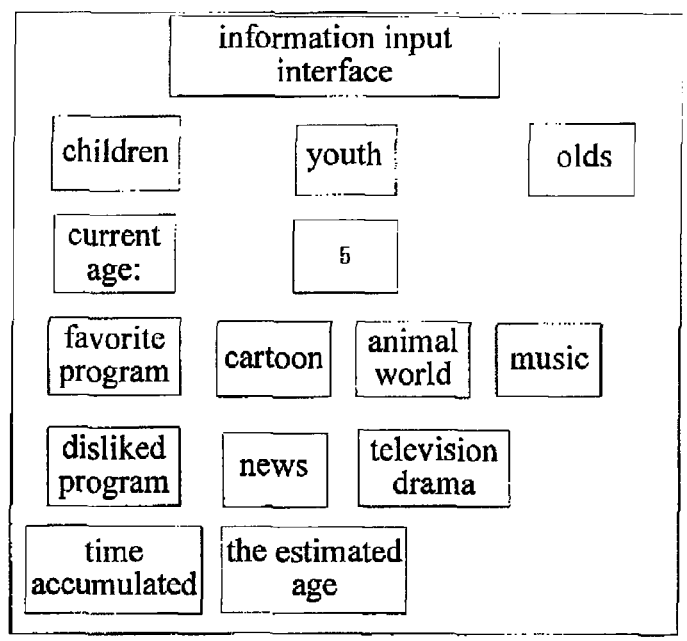
FIG. 8 is an exemplary view illustrating an interface of the video playing apparatus according to the embodiments of the present disclosure.
Figure 9:
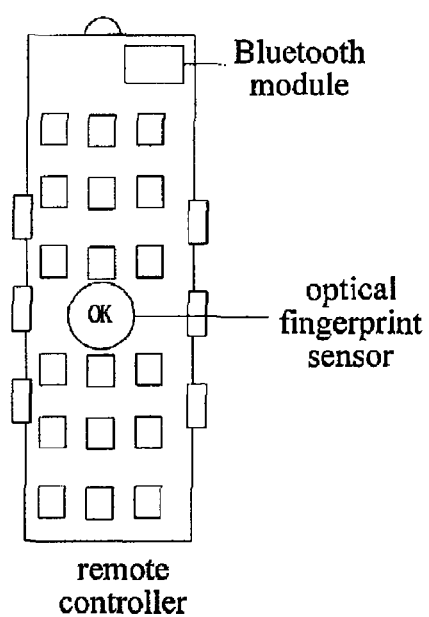
FIG. 9 is an exemplary view illustrating an appearance configuration of a remote controller, as the video playing control apparatus, according to the embodiments of the present disclosure.

In order to facilitate a better understanding of the embodiments of the present disclosure, a specific operational method of the video playing system according to the embodiments of the present disclosure would be discussed below by taking a home TV as an example of the video playing system according to the embodiments of the present disclosure. By referring to FIG. 7, the method comprises:

step 701 in which the personal information of the viewer is inputted and stored;

the personal information of the viewer is required to be inputted to the system of the home TV at first; in the present embodiment, by using a handheld remote controller as the video playing control apparatus to realize a wireless information transmission between the viewer and the video playing system, the identification information of the viewer, such as the fingerprints, and the personal information, such as the gender, the age group or an exact age, etc., can be inputted or modified, and the respective input personal information can be further edited and modified; a specific information inputting interface is as illustrated in FIG. 8.

step 702, in which the fingerprint information of the current viewer is acquired;

in this step, the identification information of the current viewer would be acquired with the handheld remote controller; in the present embodiment, the fingerprint information of the current viewer can be acquired by an optical fingerprint sensor, as an identifying module, on the remote controller and uploaded by a Bluetooth module in the remote controller; an appearance of an example of the remote controller according to the embodiments of the present disclosure is as illustrated in FIG. 9, which includes an optical fingerprint sensor for collecting the fingerprints and a Bluetooth module for transmitting the information wirelessly, but the remote controller according to the embodiments of the present disclosure is not limited thereto;

step 703, in which the fingerprint information of the current viewer is received and the matched personal information is retrieved;

in this step, the fingerprint information is compared with the pre-stored fingerprint information of the viewers after receiving the fingerprint information of the current viewer uploaded from the remote controller, and then the pre-stored personal information which is matched can be retrieved;

step 704, in which the corresponding viewing information is retrieved based on the matched personal information, and the playing of the video is controlled accordingly;

In this step, the corresponding viewing information can be retrieved based on the matched personal information, and the matched personal information can be classified, such that the viewing information for the respective categories can be obtained according to the different categories of matched personal information and the playing of the video is controlled;

In the present embodiment, the detailed operations can be performed as follows. In a case in which the age of the current viewer is less than or equal to 18, the corresponding videos are shielded according to types of programs to be shielded, and the playing of the video would be stopped automatically if the viewing duration reaches the viewing time limitation, such as 3 hours; In a case in which the age of the current viewer is between 19 and 59, the playing of the video would be paused for 5 minutes and then be resumed if the viewing duration reaches the viewing time limitation, such as 3 hours; and In a case in which the age of the current viewer is greater than or equal to 60, the video playing reminder is provided according to a stored program preference. If the viewer likes to watch the traditional opera program, the control unit can provide a playing reminder at a time 10 minutes before the specific traditional opera program begins to be played, or switch to the specific traditional opera program directly when the program starts;

step 705, in which the playing of the video is controlled with the camera.

Figure 10:
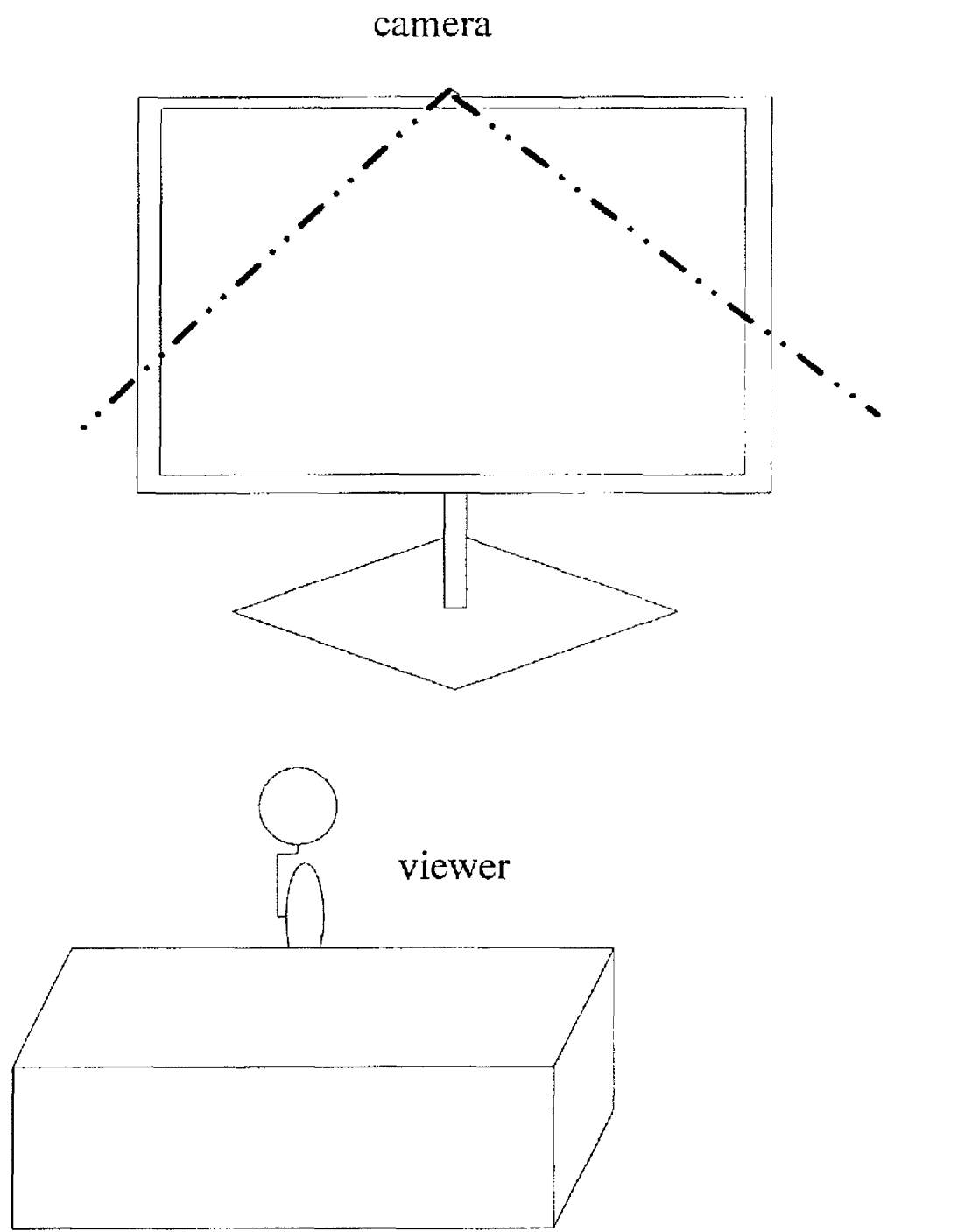
FIG. 10 is an exemplary view illustrating a location in which a camera is arranged in the embodiments of the present disclosure.

In the embodiments of the present disclosure, effective contour information of the current viewer can be captured by the camera, wherein the contour information is captured by the optical camera in a case in which the light is sufficient, while it is captured by the infrared camera in a case in which the environment is dim. The camera can be located on the top of the home TV, as illustrated in FIG. 10, but the embodiments of the present disclosure are not limited thereto. Also, the playing of the video can be controlled in time according to a feedback from the camera, and the playing of the video can be stopped when the camera fails to capture any contour information of the current viewer.

Furthermore, a specific action of the current viewer can be further determined with a trigger situation of the remote controller. The home TV would continue the playing of the video when the camera captures no active contour information of the current viewer but there is feedback on operation from the remote controller; further, the home TV would stop playing the video according to the feedback if the remote controller has not been triggered within 1 hour and no active contour information of the current viewer is captured. For example, in a specific operational process, a backlight source can be shut off at first to save energy, and then system signals are interrupted completely 3 hours later.

The whole process of the specific operation method for the video playing system according to the embodiments of the present disclosure has been discussed above.

It can be seen that, in the video playing control system and the control method according to the embodiments of the present disclosure, the identification information of the current viewer can be compared with the information as pre-stored to obtain a comparison result, so that an identification of the current viewer can be recognized, and in turn an intelligent playing control of the video can be realized according to the viewing information of the current viewer, and the power supply can be shut off in time with the camera or other feedback mechanism to save energy. The present disclosure has a good practicability and is well worth to be promoted.

Lastly, it should be understood that the embodiments described above are intended only to illustrate the solutions of the present disclosure instead of limiting a scope thereof. Although the embodiments of the present disclosure have been explained in details in connection with the above embodiments, those skilled in the art should understand that they can also make modifications on the solutions described in the above respective embodiments, or can also make equivalent replacements for a part of technical features therein. Such modification or replacements would not cause the essence of the corresponding solution to depart from the spirit and scope of the embodiments of the present disclosure.

This application claims the priority of the Chinese Patent Application No. 201410174592.9, filed on Apr. 28, 2014, in the China's State Intellectual Property Office, the disclosure of which is incorporated by reference herein as a whole.

What is claimed is:

1. A video playing apparatus comprising a memory, a receiver, a processor and a display, wherein:
the memory is configured to store personal information and corresponding viewing information of a viewer, the personal information comprises identification information;
the receiver is configured to receive the identification information of a current viewer; the processor is configured to retrieve a matched personal information in the memory according to the identification information of the current viewer; the processor is further configured to retrieve the corresponding viewing information stored in the memory according to the matched personal information, and perform a play control for a video, and the display is configured to display video information;
wherein the processor is further configured to perform a control on a playing time of the video automatically according to the viewing information corresponding to the identification information of the current viewer,
wherein the viewing information comprises a video channel playing time limitation information, and the control on the playing time of the video comprises at least one of stopping a playing of the video, pausing the playing of the video, and resuming the playing of the video;
wherein the video playing apparatus further comprises:
an optical camera and an infrared camera, connected with the processor, wherein the optical camera is configured to capture contour information of the current viewer in a case in which sufficient environment light is sufficient, and the infrared camera is configured to capture the contour information in a case in which the environment light is dim;
wherein
the personal information of the viewer further comprises at least one of gender information and age information;
the viewing information further comprises at least one of video channel shielding information, video channel selection information, and a video channel playing time reminder information.

2. The video playing apparatus of claim 1, wherein the processor
further configured to read the viewing information corresponding to the personal information of the viewer in the memory according to the matched personal information;
and the processor is further configured to control the display according to the viewing information.

3. The video playing apparatus of claim 1, wherein
the memory is further configured to store threshold conditions for a plurality of categories of the personal information and the respective viewing information corresponding to each category.

4. The video playing apparatus of claim 3, wherein
the processor is further configured to retrieve the viewing information corresponding to a certain category according to the matched personal information, in a case in which the matched personal information belongs to the certain category.

5. The video playing apparatus of claim 1, wherein
the processor further comprises a first time counter configured to start to count according to the received video channel playing time limitation information, and/or to transmit the video channel playing time limitation information satisfying a time condition and/or the video channel playing time reminder information satisfying a time condition to the display when the video channel playing time reminder information is received;
the video channel playing time limitation information satisfying the time condition comprises information on stop of video playing, information on pause of video playing and information on resuming of video playing.

6. The video playing apparatus of claim 5, wherein starting to count according to the received video channel playing time limitation information, and/or transmitting the video channel playing time limitation information satisfying the time condition and/or the video channel playing time reminder information satisfying the time condition to the display when the video channel playing time reminder information is received, comprises:

in a case in which the matched personal information belongs to a first category, transmitting the information on stop of video playing, by the first time counter, to the display if a viewing duration reaches a viewing time limitation; and/or transmitting the video channel playing time reminder information, by the first time counter, to the display if the video channel playing time reminder information is received;

in a case in which the matched personal information belongs to a second category, transmitting the information on pause of video playing, by the first time counter, to the display if the viewing duration reaches the viewing time limitation, and then transmitting the information on resuming of video playing to the display when a pause duration satisfies a demand on resuming of video playing; and/or the transmitting the video channel playing time reminder information, by the first time counter, to the display if the video channel playing time reminder information is received;

in a case in which the matched personal information belongs to a third category, transmitting the video channel playing time reminder information satisfying the time condition, by the first time counter, to the display.

7. The video playing apparatus of claim 5, further comprising:

wherein the receiver is further configured to receive a real-time signal sent from the optical or infra camera, and the processor is configured to pause the playing of the video when the real-time signal is not received;

wherein the processor further comprises a second time counter configured to start to count when the receiver fails to receive the real-time signal, and stop the playing of the video when the receiver fails to receive the real-time signal for a certain time period; and the second time counter is further configured to stop counting and resume the playing of the video when the receiver receives the real-time signal again within a certain time period.

8. A video playing control apparatus comprising:

a sensor configured to collect identification information of a current viewer; and a transmitter configured to transmit the identification information of the current viewer to a corresponding video playing apparatus so that the corresponding video playing apparatus performs a control on a playing time of a video automatically according to a viewing information corresponding to the identification information of the current viewer, wherein the corresponding video playing apparatus comprises: an optical camera configured to capture contour information of the current viewer in a case in which sufficient environment light is sufficient and an infrared camera configured to capture the contour information in a case in which the environment light is dim;

wherein the viewing information comprises a video channel playing time limitation information, and the control on the playing time of the video comprises at least one of stopping a playing of the video, pausing the playing of the video, and resuming the playing of the video;

wherein the sensor is further configured to set personal information and corresponding viewing information of the current viewer;

the personal information further comprises at least one of gender information and age information;

the viewing information further comprises at least one of video channel shielding information, video channel selection information, and a video channel playing time reminder information.

9. The video playing control apparatus of claim 8, wherein the sensor is configured to acquire at least one of fingerprints, face, voice and a password of the current viewer, as the identification information.

10. The video playing control apparatus of claim 8, wherein the video playing control apparatus is a remote controller.

11. The video playing control apparatus of claim 10, wherein the sensor is an optical fingerprint sensor configured to acquire fingerprint information of the current viewer as the identification information; and the transmitter is a Bluetooth module configured to transmit the acquired fingerprint information of the current viewer to the corresponding video playing apparatus.

12. A control method for a video playing system, comprising:

acquiring and storing personal information of a viewer and viewing information corresponding to the personal information of the viewer, wherein the personal information comprises identification information;

receiving the identification information of a current viewer;

retrieving matched personal information according to the identification information of the current viewer;

retrieving corresponding viewing information according to the matched personal information, and controlling a playing of a video; and displaying video information;

wherein a control on a playing time of the video is performed automatically according to the viewing information corresponding to the identification information of the current viewer, wherein the viewing information comprises a video channel playing time limitation information, and the control on the playing time of the video comprises at least one of stopping a playing of the video, pausing the playing of the video, and resuming the playing of the video;

wherein an optical camera is configured to capture contour information of the current viewer in a case in which sufficient environment light is sufficient, and an infrared camera is configured to capture the contour information in a case in which the environment light is dim;

wherein the personal information further comprises at least one of gender information and age information;

the viewing information further comprises at least one of video channel shielding information, video channel selection information, and a video channel playing time reminder information.

13. The control method of claim 12, wherein the identification information comprises at least one of fingerprints, face, voice and a password of the current viewer.

14. The control method of claim 13, wherein retrieving the corresponding viewing information according to the matched personal information and controlling the playing of a video comprises:

retrieving the viewing information corresponding to a certain category according to the matched personal information in a case in which the matched personal information belongs to the certain category, in order to control the playing of the video.

15. The control method of claim 14, wherein
in a case in which the matched personal information belongs to a first category, a corresponding video is shielded according to the video channel shielding information, and the playing of the video is stopped automatically if a viewing duration reaches a viewing time limitation;
in a case in which the matched personal information belongs to a second category, the playing of the video is paused for a certain time period if the viewing duration reaches the viewing time limitation and then the playing of the video is resumed; and
in a case in which the matched personal information belongs to a third category, a video playing reminder is provided according to program preference as stored.

16. The control method of claim 12, further comprises:
capturing a contour information of the current viewer in real-time, and stopping the playing of the video when no contour information of the current viewer is captured.

17. The control method of claim 16, further comprises:
shutting off the video playing system when no contour information of the current viewer is captured and no operation feedback of the current viewer is received within a set time period.

* * * * *